3,035,072
CYCLOPENTADIENYL MANGANESE
POLYPHENYL COMPOUNDS
Roy L. Pruett, Charleston, W. Va., and Donald R. Rink, Buffalo, N.Y., assignors to Union Carbide Corporation, a corporation of New York
No Drawing. Filed Sept. 22, 1958, Ser. No. 762,266
6 Claims. (Cl. 260—429)

This invention relates to organometallic compounds of manganese. More particularly, the invention relates to a novel class of cyclopentadienyl manganese polyphenyl compounds.

We have discovered a new and useful class of organomanganese compounds wherein the metal atom is bonded to one cyclopentadienyl group and to one aromatic hydrocarbon group. These compounds may be represented by the formula:

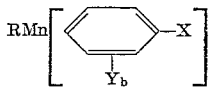

wherein R is a group selected from the class consisting of cyclopentadienyl and alkyl-substituted cyclopentadienyl; X is a group selected from the class consisting of phenyl and alkyl-substituted phenyl; Y is a group selected from the class consisting of alkyl, phenyl, alkylphenyl and phenylalkyl; and $b$ has the values 0, 1, 2, 3, 4 and 5.

The aromatic hydrocarbon portion of the above formula thus includes diphenyl, terphenyl and their alkyl derivatives. Examples of the compounds of this invention illustrative of the above formula are the following: (cyclopentadienyl)manganese(diphenyl), (methylcyclopentadienyl)manganese(diphenyl), (ethylcyclopentadienyl)manganese(diphenyl), (dimethylcyclopentadienyl)-manganese(diphenyl), (butylcyclopentadienyl)manganese(diphenyl), (cyclopentadienyl)manganese(terphenyl), (cyclopentadienyl)manganese(p,p'-dimethyldiphenyl), (cyclopentadienyl)manganese(p-ethyldiphenyl), and (methylcyclopentadienyl)manganese(p,p' - diethyldiphenyl).

The compounds of this invention may be prepared by reacting the alkali metal addition complex of an arene hydrocarbon compound having the formula:

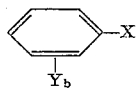

wherein X, Y and $b$ have the meanings defined hereinabove, with a cyclopentadienyl manganese halide. The alkali metal addition complex (adduct) is prepared in one of the operable solvents or solvent mixtures described hereinbelow. An example of the processs for preparing the compounds of this invention is the reaction of the potassium adduct of diphenyl with methylcyclopentadienyl manganese chloride to give (methylcyclopentadienyl)manganese(diphenyl).

The alkali metal adducts of certain arene hydrocarbons have been known for some time. See, for example, Scott, U.S. Patent 2,027,000, January 7, 1936; Scott et al., J. Am. Chem. Soc., 58, 2552 (1936); and Lipkin et al., Science, 117, 534 (1953). All of these alkali metal adducts are relatively unstable and are extremely sensitive to decomposition by air and moisture.

The exact structure of the alkali metal adducts has not been completely established. However, the stoichiometry of the reaction for their formation requires one mole of alkali metal per mole of arene hydrocarbon, and for the purpose of describing the process for preparing the compounds of this invention it will be assumed that one alkali metal atom is associated with each arene hydrocarbon molecule.

In general, the alkali metal adducts useful in preparing the compounds of this invention are addition complexes of lithium, sodium and potassium with diphenyl and terphenyl and their alkyl derivatives, and such alkali metal adducts may be prepared in a relatively restricted class of solvents. Operable solvents are ethers having not more than about four carbon atoms per oxygen atom in the ether molecule. If the ether is non-cyclic aliphatic, it should contain a methoxy group. Examples of operable solvents are dimethyl ether, methyl ethyl ether and dioxane. Ethylene glycol dimethyl ether and tetrahydrofuran are the solvents most preferred. Mixtures of the above ether solvents are also operable as are mixtures of these ether solvents with inert hydrocarbons such as xylene or kerosene.

According to the process of the present invention, the alkali metal adduct of the arene hydrocarbon may be prepared by reacting a solution of the arene compound in one of the operable solvents or solvent mixtures listed hereinabove with the alkali metal, care being exercised to exclude air and moisture. This may be conveniently done by carrying out the reaction under an atmosphere of nitrogen, argon or other inert gas. This step in the process is preferably carried out at a temperature between about $-10°$ C. and $25°$ C., although higher or lower temperatures are operable. It is also preferable to stir the resulting reaction mixture for at least one hour to insure complete reaction of the alkali metal with the arene hydrocarbon. The amount of solvent is not critical but it is preferred to use at least three parts by weight of solvent per part of arene hydrocarbon.

U.S. Patent 2,027,000 describes in detail the preparation of lithium, sodium and potassium adducts of arene hydrocarbon compounds. We have found that in preparing the sodium adducts it is preferable to employ a dispersion of sodium in an inert hydrocarbon solvent. A dispersion of sodium in an inert liquid hydrocarbon, such as xylene, kerosene or mineral oil may be prepared by agitating the molten metal in the hydrocarbon at temperatures above its melting point until a uniform dispersion is obtained. Preferably, the dispersion should contain about 40–50 weight percent sodium. The dispersion is then cooled to room temperature and slowly added to a solution of arene hydrocarbon in one of the operable solvents or solvent mixtures.

The cyclopentadienyl metal halides, including alkyl-substituted cyclopentadienyl metal halides, may be prepared by reacting an anhydrous manganese halide with an alkali metal cyclopentadienide, preferably sodium cyclopentadienide, in an inert organic ether solvent. The preparation of sodium cyclopentadienide is described in detail in Weinmayr, U.S. Patent 2,777,887, January 15, 1957. The alkali metal cyclopentadienide may be added to a suspension of the metal halide in an ether solvent slowly, with stirring, and in the absence of air and moisture. This reaction may conveniently be carried out at room temperature and will be essentially complete within about 15 minutes after all of the alkali metal cyclopentadienide has been added.

In the preferred form of the process, cyclopentadienyl manganese chlorides are used because they are relatively inexpensive, although the corresponding bromides and iodides may be used if desired.

In carrying out the process of this invention, it is convenient to combine separate preparations of the alkali metal adduct of the arene hydrocarbon and of the cyclopentadienyl manganese halide. A suspension of the cyclopentadienyl manganese halide may be prepared in an organic ether solvent which is inert to all products and reactants except for possible etherate formation with the halide-containing compound. It is preferable to employ the same solvent used in the preparation of the alkali metal adduct, but other ethers such as diethyl acetal, dibutyl acetal and the dibutyl ethers of ethylene and diethylene glycol may also be used. Diethyl ether should not be used as a major constituent in the solvent as it tends to decompose the alkali metal adduct. The amount of solvent is not critical, but it is preferable to use a considerable excess. Next, a solution of alkali metal adduct may be added slowly, with stirring, to the suspension of cyclopentadienyl manganese halide. Again, care should be exercised to exclude air and moisture. After the addition is complete, the reaction mixture may be stirred for about one hour or longer.

The temperatures at which this reaction may be carried out vary over a considerable range of from −80° C. to 100° C. However, it is preferred to carry out the reaction at temperatures between about −20° C. and 40° C.

The time necessary to carry out the reaction may be varied over wide limits. The yields do not appear to be materially reduced by maintaining the reactants under the desired reaction conditions for extended periods of time. Generally, it is preferred to maintain the reactants at a temperature between about −20° C. and 40° C for about one hour after the addition of all of the alkali metal adduct.

The best yields of products are obtained when stoichiometric, that is, one mole of alkali metal adduct per mole of halogen in the cyclopentadienyl manganese halide, amounts of reactants are used. However, the process is operable with non-stoichiometric reactant ratios.

The reverse order of combining the reactants may also be used; that is, the cyclopentadienyl manganese halide may be added to the solution of alkali metal adduct. The conditions of temperature, reaction time and reagent ratios for this mode of addition are the same as described hereinabove.

The product may be recovered from the reaction mixture by removing the ether solvent under reduced pressure and then extracting the organic material from the solid residue with a non-polar solvent such as benzene, heptane or petroleum ether. The extract may then be evaporated to dryness and the cyclopentadienyl manganese diphenyl compound recovered from the resulting solid by sublimation under reduced pressure.

The compounds of this invention are orange-to-red crystalline solids which are soluble in acetone, ethers, lower aliphatic monohydric alcohols, benzene, petroleum ether, kerosene and gasoline. They are stable in air and in solution in the absence of light, but decompose slowly on exposure to light.

The following detailed example is illustrative of the method for preparing the compounds of this invention.

A diphenyl sodium complex was prepared under an argon atmosphere, by the reaction of 23.1 grams (0.15 mole) of diphenyl in 250 milliliters of ethylene glycol dimethyl ether with 6.0 grams of a 50% dispersion of sodium in toluene.

Sodium cyclopentadienide was prepared in a separate flask by stirring 6.9 grams of a 50 weight percent sodium dispersion in toluene (0.15 mole Na) in 250 milliliters of anhydrous ethylene glycol dimethyl ether and adding thereto 10.8 grams (0.17 mole) of cyclopentadiene. An argon atmosphere was maintained throughout. The temperature of the reaction mixture was held below 40° C. during the addition. White crystals of sodium cyclopentadienide were formed.

In a third flask, a milk-white suspension of manganous chloride in ethylene glycol dimethyl ether was prepared by stirring 18.9 grams (0.15 mole) of anhydrous manganous chloride in finely divided condition in 250 milliliters of ethylene glycol dimethyl ether at room temperature for one hour. The sodium cyclopentadienide was then added to the manganous chloride at room temperature with stirring. After about 15 minutes the reaction mixture containing cyclopentadienyl manganese chloride was cooled to −20° C. and the diphenyl sodium complex added slowly over a period of about 15 minutes. The reaction mixture was maintained below −10° C. for one hour, allowed to warm to room temprature and then filtered. The red-brown filtrate was evaporated to dryness at reduced pressure. The residue, when leached with n-heptane, gave bright red-orange solution. The n-heptane solution was evaporated to dryness to yield red-orange crystals which were purified by fractional sublimation. Red crystals of (cyclopentadienyl)manganese-(diphenyl) were obtained. (Cyclopentadienyl)manganese(diphenyl) is a red solid, M.P. 73°–75° C., which distills at 80°–90° C. and a pressure of 0.04 mm. Hg. It is stable to air in heptane in the absence of light, but slowly decomposes in the presence of light.

The lithium and potassium adducts of arene hydrocarbons may be employed in similar reaction procedures. Other examples of preparing the compounds of this invention are the reaction of the potassium adduct of diphenyl, prepared in tetrahydrofuran, with methylcyclopentadienyl manganese chloride to give (methylcyclopentadienyl)manganese(diphenyl) and the reaction of the sodium adduct of p,p′-diethyldiphenyl, prepared in ethylene glycol dimethyl ether, with cyclopentadienyl manganese chloride to give (cyclopentadienyl)manganese(p,p′-diethyldiphenyl).

The compounds of this invention are useful as antiknock additives for motor fuels. Illustrative of the advantages of fuel compositions containing the compounds of this invention as additives, it has been found, using from 0.25 to 0.50 gram of (cyclopentadienyl)manganese-(diphenyl)($C_5H_5$)Mn($C_{12}H_{10}$), per 400 milliliters of standard 60 octane fuel mixture (60 vol.-percent isooctane and 40 vol.-percent n-heptane) in an internal combustion engine, that the octane rating of the fuel mixture increased from 1.7 to 2.3 units.

The following table presents the results of adding 0.25 gram and 0.50 gram of (cyclopentadienyl)manganese(diphenyl) to 400 milliliters of a standard 60 octane ASTM fuel mixture. The tests were conducted according to ASTM research octane rating method D–908.

| Additive | | Resulting Fuel Octane Number | |
|---|---|---|---|
| gms./400 ml. | gms./gal. | ($C_5H_5$)Mn($C_{12}H_{10}$) | No Additive |
| 0 | 0 |  | 60 |
| 0.25 | 2.4 | 61.7 |  |
| 0.50 | 4.7 | 62.3 |  |

The maximum desirable concentration of the additive is about 30 grams per gallon.

What is claimed is:

1. As novel compositions of matter the organomanganese compounds having the formula

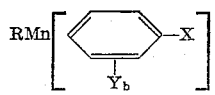

wherein R is a group selected from the class consisting of cyclopentadienyl and lower alkyl-substituted cyclopentadienyl; X is a group selected from the class consisting of phenyl and lower alkyl-substituted phenyl; Y is a group selected from the class consisting of lower alkyl, phenyl, lower alkylphenyl and phenyl-lower alkyl; and $b$ is an integer selected from the group consisting of zero and 1.

2. (Cyclopentadienyl)manganese(diphenyl).
3. (Methylcyclopentadienyl)manganese(diphenyl).
4. (Cyclopentadienyl)manganese(p,p' - diethyldiphenyl).
5. (Ethylcyclopentadienyl)manganese(p-methyldiphenyl).
6. (Cyclopentadienyl)manganese(terphenyl).

References Cited in the file of this patent
UNITED STATES PATENTS 2,818,416  Brown et al. _____ Dec. 31, 1957

OTHER REFERENCES

Piper et al.: "Journal of Inorg. Nucl. Chem.," September 1956, vol. 3, page 104.
Fischer et al.: "Chem. Berichte" 89, 1809–1815 (1956).
Coffield et al.: "J.A.C.S." 79, 5826 (1957).